(12) United States Patent
Bochen et al.

(10) Patent No.: US 8,601,891 B2
(45) Date of Patent: Dec. 10, 2013

(54) DRIVING DEVICE

(75) Inventors: Marian Bochen, Eitelborn (DE); Michael Knopp, Sterling Heights, MI (US)

(73) Assignee: Stabilus GmbH, Koblenz (DE)

( * ) Notice: Subject to any disclaimer, the term of this patent is extended or adjusted under 35 U.S.C. 154(b) by 179 days.

(21) Appl. No.: 13/310,188

(22) Filed: Dec. 2, 2011

(65) Prior Publication Data

US 2012/0137803 A1 Jun. 7, 2012

(30) Foreign Application Priority Data

Dec. 3, 2010 (DE) .................. 10 2010 053 226

(51) Int. Cl.
*F16H 27/02* (2006.01)

(52) U.S. Cl.
USPC .................. 74/89.38; 74/89.37; 74/89.39

(58) Field of Classification Search
USPC ............... 74/89, 89.37, 89.23, 424.5, 424.71, 74/89.39, 89.38
See application file for complete search history.

(56) References Cited

U.S. PATENT DOCUMENTS

| | | | | |
|---|---|---|---|---|
| 2,824,460 A | * | 2/1958 | Davis | 74/424.71 |
| 3,824,420 A | * | 7/1974 | Stegeman et al. | 310/80 |
| 5,131,510 A | * | 7/1992 | Jamrus et al. | 188/171 |
| 5,172,617 A | * | 12/1992 | Rohm | 82/142 |
| 5,355,743 A | * | 10/1994 | Tesar | 74/490.03 |
| 5,673,593 A | * | 10/1997 | Lafferty | 74/89.38 |
| 5,793,574 A | * | 8/1998 | Cranson et al. | 360/261.3 |
| 6,879,065 B2 | * | 4/2005 | Corbett et al. | 310/12.01 |
| 7,347,115 B2 | * | 3/2008 | Otaki et al. | 74/89.38 |
| 7,680,565 B2 | * | 3/2010 | Balasu et al. | 701/3 |
| 7,770,491 B2 | * | 8/2010 | Ritter et al. | 74/560 |
| 8,375,814 B2 | * | 2/2013 | Hillen et al. | 74/89.38 |
| 8,457,836 B2 | * | 6/2013 | Balasu et al. | 701/31.4 |
| 2003/0071537 A1 | * | 4/2003 | Chen | 310/268 |
| 2005/0081660 A1 | * | 4/2005 | Migliori | 74/25 |
| 2008/0319590 A1 | * | 12/2008 | Balasu et al. | 701/3 |
| 2009/0078523 A1 | * | 3/2009 | Grzeslo et al. | 192/45 |
| 2009/0224703 A1 | * | 9/2009 | Woods et al. | 318/17 |
| 2010/0241242 A1 | * | 9/2010 | Herr et al. | 623/24 |
| 2010/0250047 A1 | * | 9/2010 | Balasu et al. | 701/29 |
| 2010/0288520 A1 | * | 11/2010 | Dayton et al. | 173/1 |
| 2011/0045932 A1 | * | 2/2011 | Fauteux et al. | 475/221 |
| 2011/0048147 A1 | * | 3/2011 | Keech et al. | 74/89.26 |
| 2012/0022458 A1 | * | 1/2012 | Oh et al. | 604/189 |
| 2012/0132450 A1 | * | 5/2012 | Timm et al. | 173/47 |

\* cited by examiner

*Primary Examiner* — David M Fenstermacher
(74) *Attorney, Agent, or Firm* — Cozen O'Connor

(57) ABSTRACT

A driving device having a housing tube connected to a stationary base part or a movable structural component part a protective tube connected to the other respective part a spindle drive which has a threaded spindle and a spindle nut arranged on the threaded spindle by which the housing tube and protective tube are movable axially relative to one another, and a rotary drive that drives the spindle drive via a clutch, a rotationally rigid interconnection thereof can be canceled when a determined torque is exceeded. A magnetic ring having a plurality of north and south poles is rotationally arranged near a stationary sensor element. The magnetic ring is arranged at the clutch that is connected to the threaded spindle, fixed with respect to rotation relative to it.

7 Claims, 2 Drawing Sheets

DRIVING DEVICE

BACKGROUND OF THE INVENTION

1. Field of the Invention

The invention is directed to a driving device, particularly for a hatch in a vehicle, having a housing tube connected to a stationary base part, particularly to a vehicle body, or to a movable structural component part, particularly a vehicle hatch or vehicle door, a protective tube that can be connected to the other respective part, i.e., the movable structural component part or the stationary base part, a spindle drive that has a threaded spindle and a spindle nut arranged on the threaded spindle by which the housing tube and protective tube are axially movable relative to one another, and a rotary drive that drives the spindle drive in rotation via an overload protection device formed by a clutch device, wherein the rotationally rigid interconnection thereof can be canceled when a determined torque is exceeded.

2. Description of the Related Art

There are many known variations of driving devices of the type mentioned above. However, it is disadvantageous in these drives that an erroneous calculation of the hatch position can occur in manual operation while a connected control device is inactive or when the clutch installed in the spindle drive is disengaged. Therefore, it is no longer possible for the rear hatch to move reliably to the end positions, i.e., the completely opened position or completely closed position.

SUMMARY OF THE INVENTION

Therefore, it is an object of the invention to provide a driving device of the type mentioned above having a simple and economical construction in which an accurate calculation of the hatch position is possible.

According to one embodiment of the invention a magnetic ring having a plurality of north poles and south poles is arranged to be rotationally movable near a sensor element, the magnetic ring cooperating with the sensor element is arranged at a part of the clutch device that is connected to the threaded spindle to be fixed with respect to rotation relative to it, and the sensor element is arranged so as to be stationary with respect to the housing tube.

This arrangement makes it possible to determine the position of the vehicle hatch even when the clutch device has disengaged due to overloading of the driving device.

The assembly of the structural component parts is greatly facilitated when the Hall sensor is arranged at the inner wall of a housing tube of the clutch device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment example of the invention is shown in the drawings and described more fully in the following. The drawings show.

DETAILED DESCRIPTION OF THE PRESENTLY PREFERRED EMBODIMENTS

Figure 1:
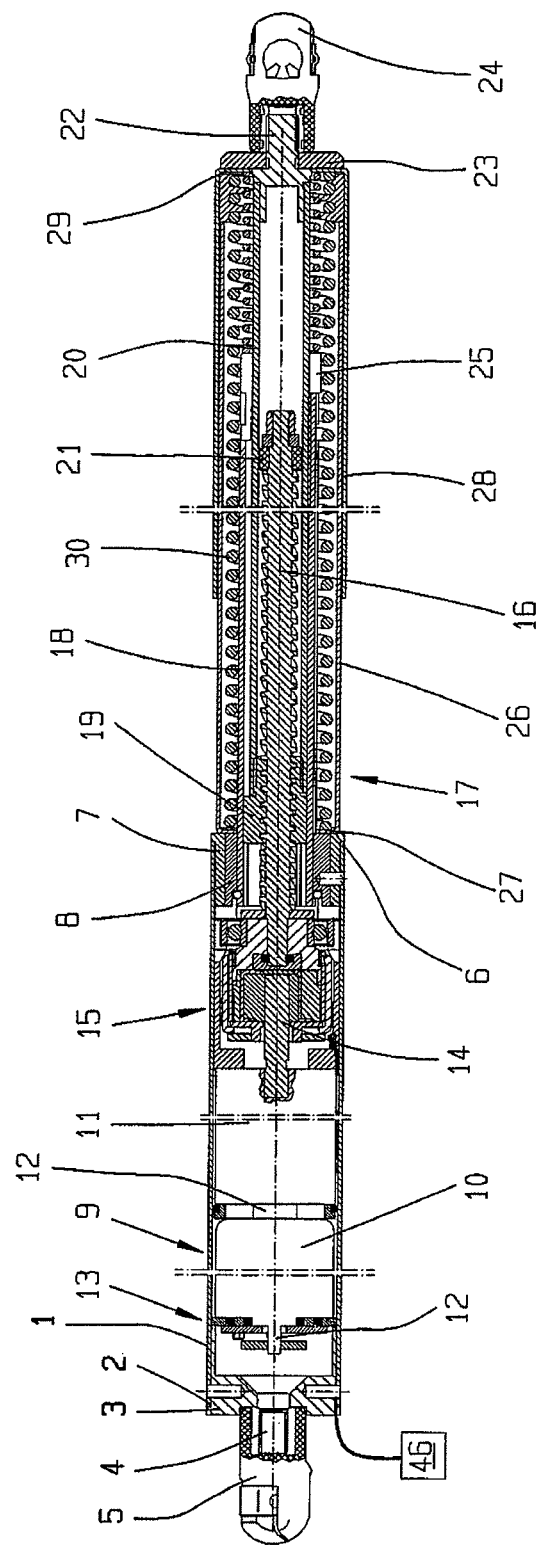
FIG. 1 is a cross section through a driving device.

The driving device shown in FIG. 1 has a first housing tube 1 having a first end 2 which is closed by a bottom piece 3. A threaded pin 4 is formed at the bottom piece, and a first fastening device 5 in the form of a ball socket is screwed onto this threaded pin 4. A sleeve 7 is arranged at a second end 6 opposite the first end 2, a guide bushing 8 is arranged in sleeve 7 with an interference fit. Alternatively, the sleeve 7 and guide bushing 8 are constructed to form one piece.

A rotary drive 9 comprising an electric motor 10 and a transmission 11 is arranged near the first end 2 of the first housing tube 1. A driveshaft 12 projects out of both front sides of the electric motor 10 and drives a sensor device 13 on one side and the transmission 11 on the other side. On the side of the transmission 11 opposite the electric motor 10, a transmission output shaft 14 extends in direction of the second end 6. A clutch device 15 is connected to the transmission output shaft 14 on one side and to a threaded spindle 16 of a spindle drive 17 on the other side, this threaded spindle 16 extending through the guide bushing 8. Further, a guide tube 18 which coaxially encloses the threaded spindle 16 extends through the guide bushing 8.

A spindle nut 19 which is guided in the guide tube 18 to be axially displaceable but fixed with respect to rotation relative to the guide to be is arranged on the threaded spindle 16. The spindle nut 19 is connected to one end of a spindle tube 20 which encloses the threaded spindle 16 coaxially, the threaded spindle 16 being guided in the spindle tube 20 at its end opposite the clutch device 15 by a spindle guide 21 to prevent radial movements of the threaded spindle 16. A threaded bolt 22 is arranged at the guide tube 18 at the end opposite the spindle nut 19. A supporting disk 23 which is fixed to the threaded bolt 22 by a second fastening device 24 in the form of another ball socket is in turn fitted to the guide tube 18.

A guide bushing 25 that guides the spindle tube 20 displaceably in axial direction is arranged at the end of the guide tube 18 opposite the end resting in the guide bushing 8. The guide tube 18 is coaxially enclosed by a second housing tube 26. The second housing tube 26 is supported by an inner flange 27 at the second end 6 of the first housing tube 1 and at the guide bushing 8 or sleeve 7.

The second housing tube 26 is enclosed in turn at least partially by a protective tube 28. The protective tube 28 has an inner flange 29 which contacts the supporting disk 23.

To assist the extending movement of the driving device, a helical compression spring 30 is arranged between the guide tube 18 and the second housing tube 26 and protective tube 28 and is supported at the inner flange 27 of the second housing tube 26 and the inner flange 29 of the protective tube 28.

Figure 2:
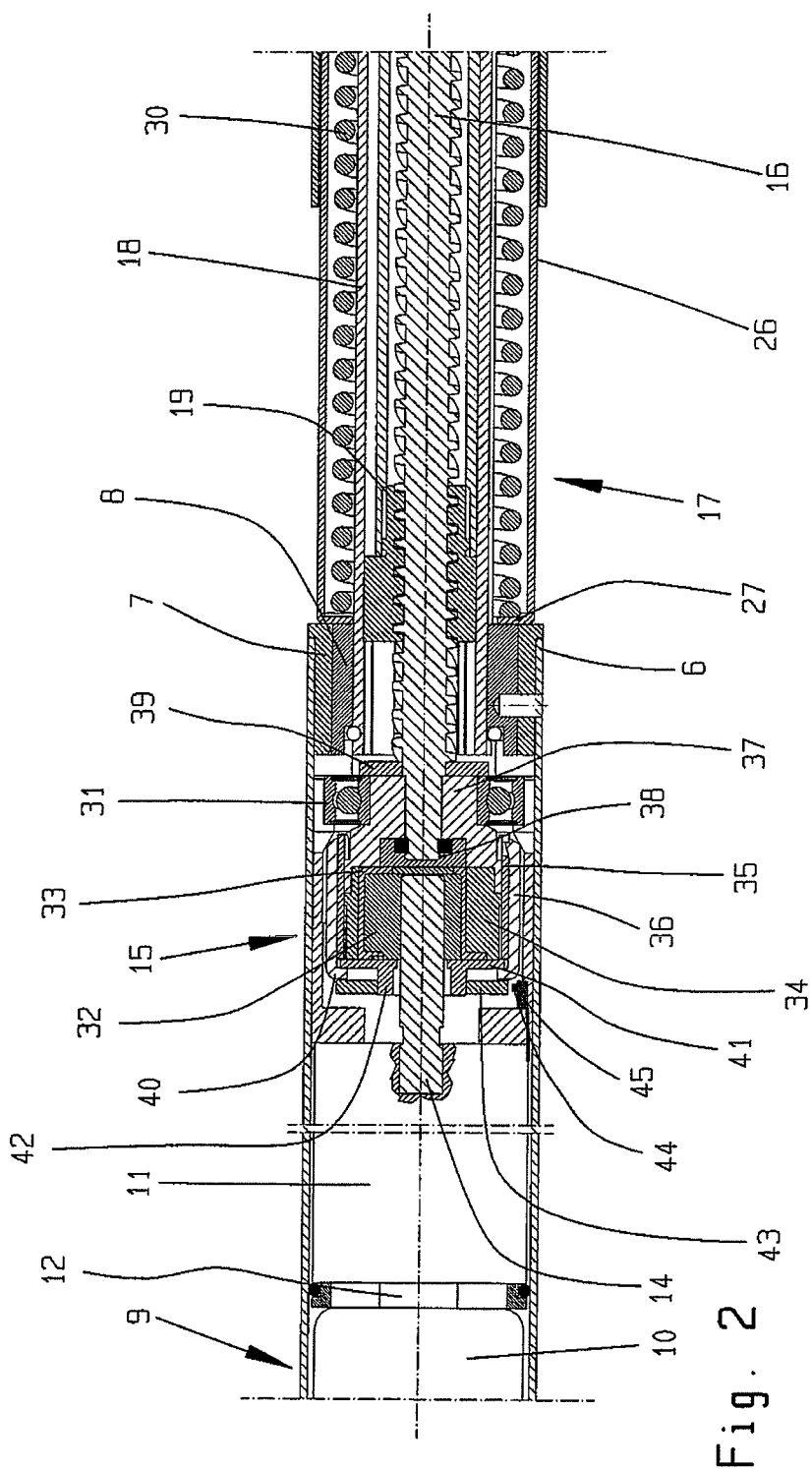
FIG. 2 is an enlarged section through the driving device according to FIG. 1.

FIG. 2 shows a section of the driving device shown in FIG. 1, particularly the individual structural component parts of the clutch device 15.

The clutch device 15 is arranged between the transmission 11 and a spindle bearing 31. The clutch device 15 comprises an inner part 32, a damping element 33, an intermediate part 34, a spring ring 35, and an outer part 36. However, different positions of the clutch device in the drivetrain and a different construction of the clutch, for example, with friction disks, are also possible.

For purposes of torque transmission, the transmission output shaft 14 is insertably connected to the inner part 32 by a positive or frictional engagement, for example, serrations. Together with the damping element 33 and the intermediate part 34, the inner part 32 forms a flexible claw coupling.

The intermediate part 34 is connected to the outer part 36 by the spring ring 35. The spring ring 35 is fixed in the outer part 36 in axial and radial direction.

The connection of the spring ring 35 to the intermediate part 34 is preferably carried out by a plurality of radially arranged spring arms that engage in radially circumferential troughs at the outer lateral surface of the intermediate part 34. These troughs are preferably wave-shaped or triangular.

Torque is transmitted into the outer part 36 of the clutch device 15 via the transmission output shaft 14, the inner part 32, the damping element 33, the intermediate part 34 and the spring ring 35.

Torque is transmitted between the spring ring 35 and the intermediate part 34 via the ends of the spring arms. Proceeding from a certain torque, the intermediate part 34 is rotated relative to the spring ring 35 and, when the intermediate part 34 rotates further, the spring arms are first pressed radially outward over the ends and then bend back again so that the ends lock into the next trough.

The clutch device 15 is supported radially and axially in the spindle bearing 31. As can be seen from FIG. 2, a connection device 37 having a smaller outer diameter is provided at the outer part, the threaded spindle 16 being inserted therein. The transmission of torque to the threaded spindle 16 takes place via a serration. The threaded spindle 16 is secured axially in the outer part 36 by a rivet connection 38. An annular disk 39 is arranged between the spindle bearing 31 and the guide tube 18 so that the clutch device 15 is fixed in axial direction. Forces acting in axial direction are guided around the clutch device by the annular disk 39 and the structural components arranged around the clutch device 15.

The end of the outer part 36 facing in the direction of the transmission 11 is beaded on the inner side so as to form a flange 40 and holds a disk 41 of a supporting element 40 in a position between the inner part 32, damping element 33, intermediate part 34 and spring ring 35 on one side and the flange 40 on the other side. A sleeve 42 which is connected to the disk 41 so as to form one piece extends onward from the disk 41 in direction of the transmission 11. A magnetic ring 43 having a plurality of north poles and south poles is arranged on the sleeve 42. The magnetic ring 43 cooperates with a sensor element 44 arranged on a printed circuit board 45. The printed circuit board 45 is arranged at the inner wall of the housing 46 of the clutch device 15.

The sensor element 44 comprises at least one Hall sensor, but preferably two Hall sensors having a defined phase offset. Although shown as one component part in the present case, it is also possible to use two separate Hall sensors.

When the movable part, for example, the hatch of a motor vehicle, is operated manually when the control device 46 is deactivated or "sleeping", control device 46 is switched on by a signal of the Hall sensor, or of both Hall sensors, via lines, only suggested in the drawing, so that the rotational movement of the threaded spindle 16 is sensed via the outer part 36 of the clutch device 15, which outer part 36 is connected to the threaded spindle 16 so as to be fixed with respect to rotation relative to it, and by the magnetic ring 43 which is connected to the outer part 36 likewise so as to be fixed with respect to rotation relative to it.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A driving device comprising:
    a housing tube connectable to one of a stationary base part and a movable structural component part;
    a protective tube connectable to the other of the stationary base part and the movable structural component part;
    a spindle drive by which the housing tube and protective tube are movable axially relative to one another, comprising:
    a threaded spindle: and
        a spindle nut arranged on the threaded spindle;
        a rotary drive that drives the spindle drive in rotation via an overload protection device, a rotationally rigid interconnection of the overload protection device configured to be canceled when a determined torque is exceeded;
    a sensor element arranged so as to be stationary with respect to the housing tube; and
    a magnetic ring having a plurality of north poles and south poles arranged to be rotationally movable near the sensor element, the magnetic ring cooperating with the sensor element,
        wherein the magnetic ring is arranged at a part of the overload protection device that is connected to the threaded spindle to be fixed with respect to rotation relative to the threaded spindle.

2. The driving device according to claim 1, wherein the sensor element is arranged at the inner wall of the housing of the clutch device.

3. The driving device according to claim 1, wherein the stationary base part is a vehicle body.

4. The driving device according to claim 1, wherein the movable structural component part is one of a vehicle hatch and a vehicle door.

5. The driving device according to claim 1, wherein the overload protection device is a clutch device.

6. The driving device according to claim 1, wherein the sensor element is a Hall effect sensor.

7. The driving device according to claim 1, wherein the sensor element is a plurality of Hall effect sensors.

* * * * *